United States Patent [19]

Buxton

[11] Patent Number: 4,924,993
[45] Date of Patent: May 15, 1990

[54] CONVEYOR ASSEMBLY

[76] Inventor: Robert W. Buxton, 4832 Turnbuckle Wind, Harbourside Townhouses, Ladner, BC, Canada, V4K 4A6

[21] Appl. No.: 268,899

[22] Filed: Nov. 8, 1988

[30] Foreign Application Priority Data

Jun. 8, 1988 [CA] Canada .................................. 568985

[51] Int. Cl.$^5$ ............................................. B65G 41/00
[52] U.S. Cl. .................................... 193/311; 198/314; 198/588; 198/589
[58] Field of Search ............... 198/313, 314, 317, 318, 198/589, 311, 588, 594; 414/503, 523

[56] References Cited

U.S. PATENT DOCUMENTS

| 29,110 | 1/1977 | Oury | 198/314 |
|---|---|---|---|
| 2,805,759 | 9/1957 | Mancleau | 198/318 X |
| 3,285,385 | 11/1966 | Langner | 198/317 X |
| 3,675,762 | 7/1972 | Arndt | 198/314 X |
| 4,058,198 | 11/1977 | O'Neill et al. | 198/313 |
| 4,427,104 | 1/1984 | Reid, Jr. | 198/306 |
| 4,523,669 | 6/1985 | Smith | 198/313 |
| 4,624,357 | 11/1986 | Oury et al. | 198/313 |
| 4,646,906 | 3/1987 | Wilcox, Jr. et al. | 198/303 |
| 4,712,962 | 12/1987 | Johnston | 198/589 X |
| 4,805,756 | 2/1989 | Kolleth et al. | 198/317 X |

FOREIGN PATENT DOCUMENTS 1016097  8/1977  Canada .
1143321  3/1983  Canada .
3034590  4/1982  Fed. Rep. of Germany ...... 198/314

Primary Examiner—David A. Bucci
Assistant Examiner—James R. Bidwell
Attorney, Agent, or Firm—Bull, Housser & Tupper

[57] ABSTRACT

The invention provides a conveyor assembly having a support structure and a first conveyor extending from the support structure. There is a first vertical pivot for permitting rotation of the first conveyor about the support structure in a generally horizontal plane. There is a first horizontal pivot for permitting vertical pivoting of the first conveyor relative to the support structure and a hydraulic cylinder for maintaining the first conveyor at a required vertical angle while cantilevered from the support structure. There is a second conveyor extending from the second end of the first conveyor, and a second vertical pivot for connecting the second conveyor to the second end of the first conveyor and permitting rotation of the second conveyor about the second end of the vertical conveyor in a generally horizontal plane. There is a second horizontal pivot permitting pivoting of the second conveyor in a vertical plane and a hydraulic cylinder for maintaining the second conveyor at a required vertical angle while cantilevered from the second end of the first conveyor. There may also be a third conveyor having a first end for mounting adjacent the ground, and a second end for mounting adjacent the first end of the first conveyor.

19 Claims, 4 Drawing Sheets

CONVEYOR ASSEMBLY

BACKGROUND OF THE INVENTION

This invention relates to a foldable conveyor assembly particularly adapted for placing concrete at desired locations over a relatively wide area.

Numerous forms of conveyor arrangements have been disclosed for the purpose of continuously transporting concrete, aggregates or other fluid materials between a loading point and nearby delivery points. These have included single and multiple conveyor boom devices, as well as telescoping conveyors. Many of these are adaptable for mounting on a mobile vehicle.

The conveyor devices presently known suffer in that, for a given loading point, the area over which materials may be delivered is limited. Single boom conveyors pivotable about the loading point are capable of delivering materials only to a single point or along the circumferential path traced out as the boom rotates. Pivotal telescoping boom conveyors may be utilized to deliver materials to points within the area traced out between the minimal and the maximum extension of the boom.

As well, delivery close to the loading point base is difficult. Telescoping arrangements are significantly more complex to build and operate, and require substantial support at their bases. Designs employing multiple booms in series and which are pivotal about the loading point as well as about the junctures of successive conveyor sections, also allow delivery over a wide area. However, delivery may be restricted by the degree of rotation available at any given juncture, and the heights over which the boom may extend.

Arrangements involving single, multiple or telescoping boom arrangements as presently known are not adaptable for delivery of materials at both a variety of distances and elevations.

An object of the present invention therefore, is to provide a conveyor capable of being mounted on a mobile vehicle, and capable of delivering materials over a much wider horizontal area, and over a range of relative elevations not available by means of conveyors previously known.

SUMMARY OF THE INVENTION

According to the invention, a conveyor assembly has a support structure and a first conveyor extending radially from the support structure and having opposite first and second ends. A first connecting means connects the first end of the first conveyor to the support structure. The first connecting means includes first pivotable means for permitting rotation of the first conveyor about the support structure in a generally horizontal plane through substantially 360° and support means for maintaining the first conveyor at a required vertical angle while cantilevered from the support structure. A second conveyor extends from the second end of the first conveyor. A second connecting means connects the second conveyor to the second end of the first conveyor. The second connecting means includes second pivotable means for permitting pivoting of the second conveyor about the second end of the first conveyor in a generally horizontal plane through an angle of substantially 360° and support means for maintaining the second conveyor at a required vertical angle while cantilevered from the second end of the first conveyor.

There may also be a third conveyor having a first end for mounting adjacent the ground, and a second end for mounting adjacent the first end of the first conveyor. There is a second discharge means for discharging the third conveyor onto the first end of the first conveyor, and means for permitting angular adjustment of the third conveyor about a vertical axis through the first end of the first conveyor.

DESCRIPTION OF THE PREFERRED EMBODIMENTS

Figure 2:
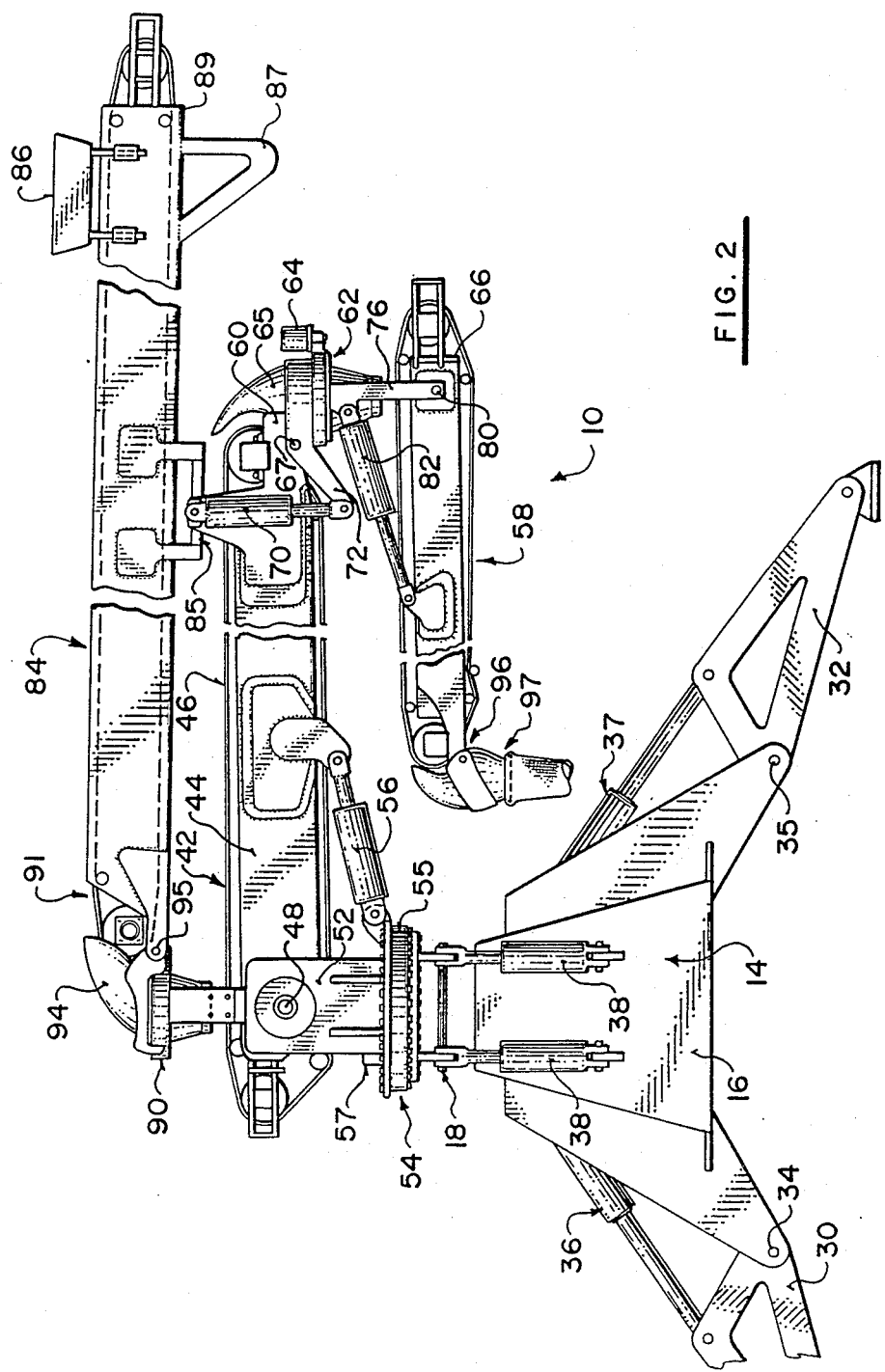
FIG. 2 is a side fragmentary rear elevation showing the conveyor assembly fully folded.
Figure 3:
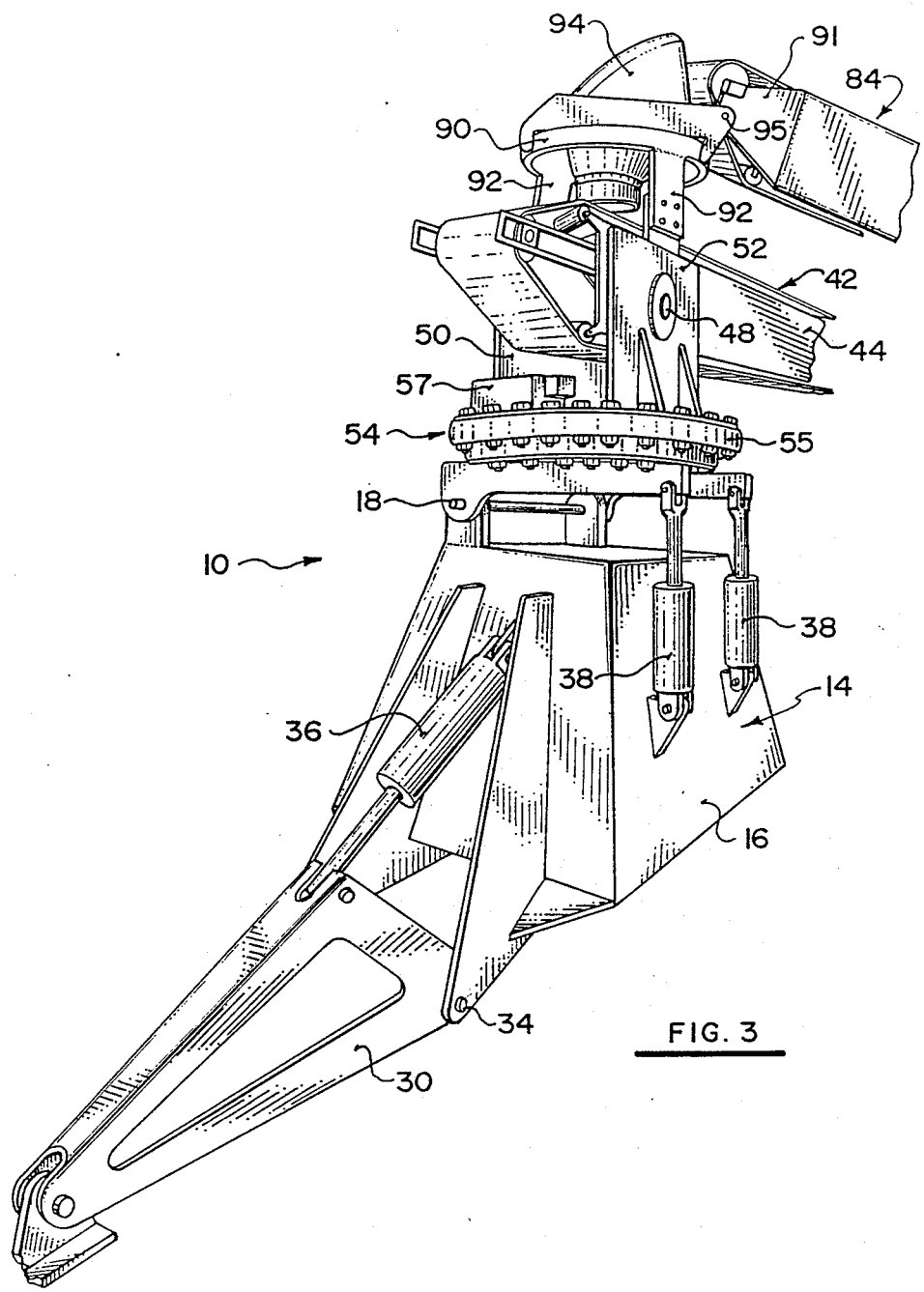
FIG. 3 is an enlarged, fragmentary perspective view showing the first end of the first conveyor, the support structure for mounting the assembly on the truck, and the discharge end of the feed conveyor.

Referring to the drawings, these show a conveyor assembly 10, according to an embodiment of the invention, mounted on a truck 12 by means of a tower-like support structure 14, best shown in FIG. 2 and FIG. 3. The support structure includes a trapezoidal body 16, made of structural steel members in this case, connected to frame 22 of the truck. The support structure has means to permit pivoting of the conveyor assembly forwards or rearwards relative to the vehicle by means of a hinge assembly 18.

The support structure includes a pair of outrigger legs 30 and 32 shown in FIG. 2. These outrigger legs are each connected to the body 16 in a pivotal manner by pins 34 and 35. Hydraulic cylinders 36 and 37 connect each leg to the body and thus can be used to deploy the legs or retract them upwardly. The cylinders can be deployed different amounts to level the conveyor assembly.

Leveling fore and aft relative to the frame 22, or tilting relative to the frame is accomplished by means of a pair of cylinders 38 extending between a swivel 54 and body 16 of the support structure, as shown best in FIG. 3. In this manner, the entire conveyor assembly, apart from the support structure, can be tilted forwards or rearwards relative to the vehicle as indicated by arrows 40 of FIG. 1.

Figure 1:
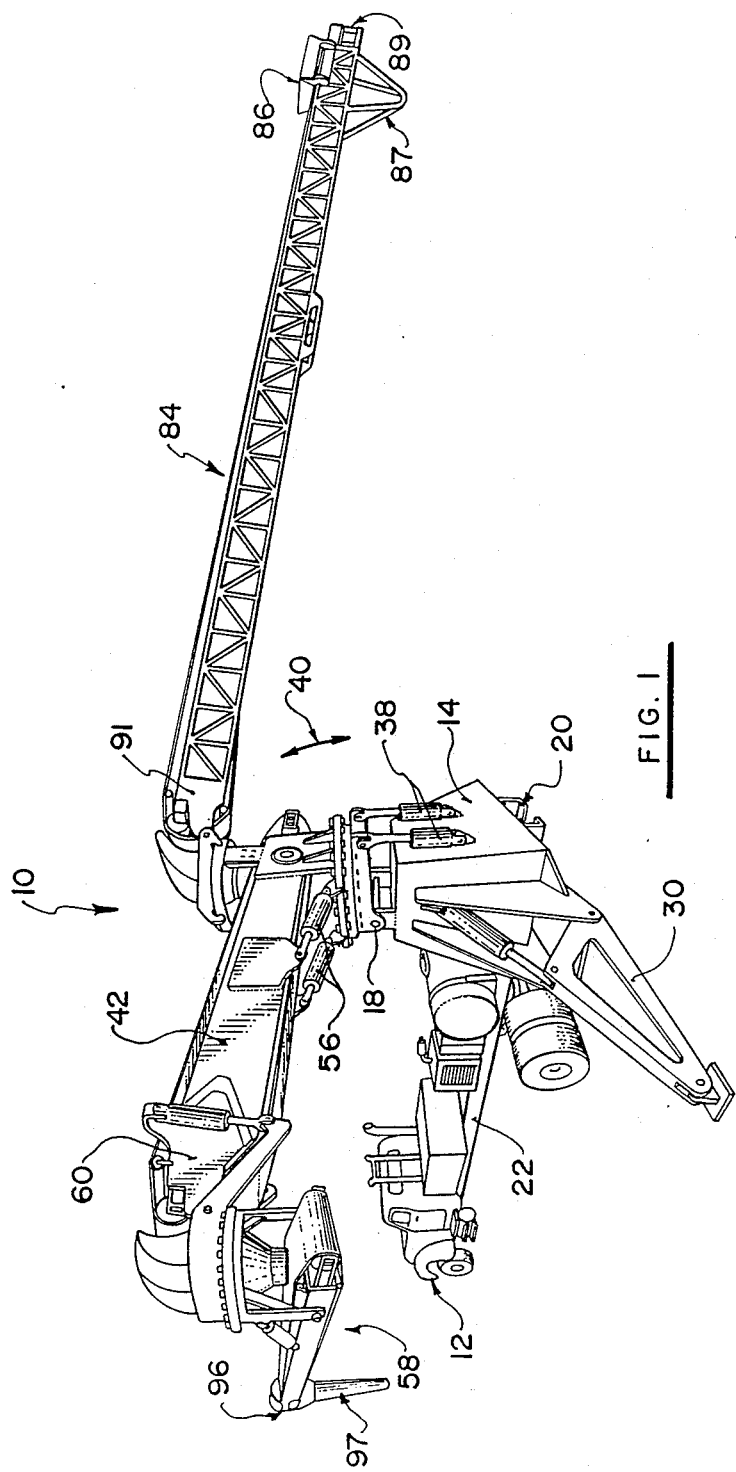
FIG. 1 is a perspective view of a conveyor assembly according to the invention, mounted on a truck and in an extended position.

Main conveyor 42, also referred to as the first conveyor, is a belt conveyor which includes a boom 44 and a continuous belt 46 shown in FIG. 2. It is conventional in design, and thus is not described further herein. A shaft 48 pivotally connects the conveyor to a pair of spaced-apart plates 50 and 52 shown in FIG. 3. These plates are connected to the swivel 54 on the top of body 16. The swivel 54 serves as first pivotable means for permitting pivoting of conveyor 42 about the support structure 14 in a generally horizontal plane, and through an angle of 360°. The swivel includes an outer race 55 and an inner race (not shown) having an internal ring gear. A motor 57 has a gear (not shown) on its shaft which meshes with the ring gear to rotate the conveyor 42. The shaft 48, together with a pair of hydraulic cylinders 56, both of which are shown in FIG. 1, comprise adjustment means for adjusting the vertical angle of the first conveyor. Furthermore, when the cylinders are fixed in position, they act as support means for maintaining the first conveyor at a required vertical angle while cantilevered from the support structure 14.

Figure 4:
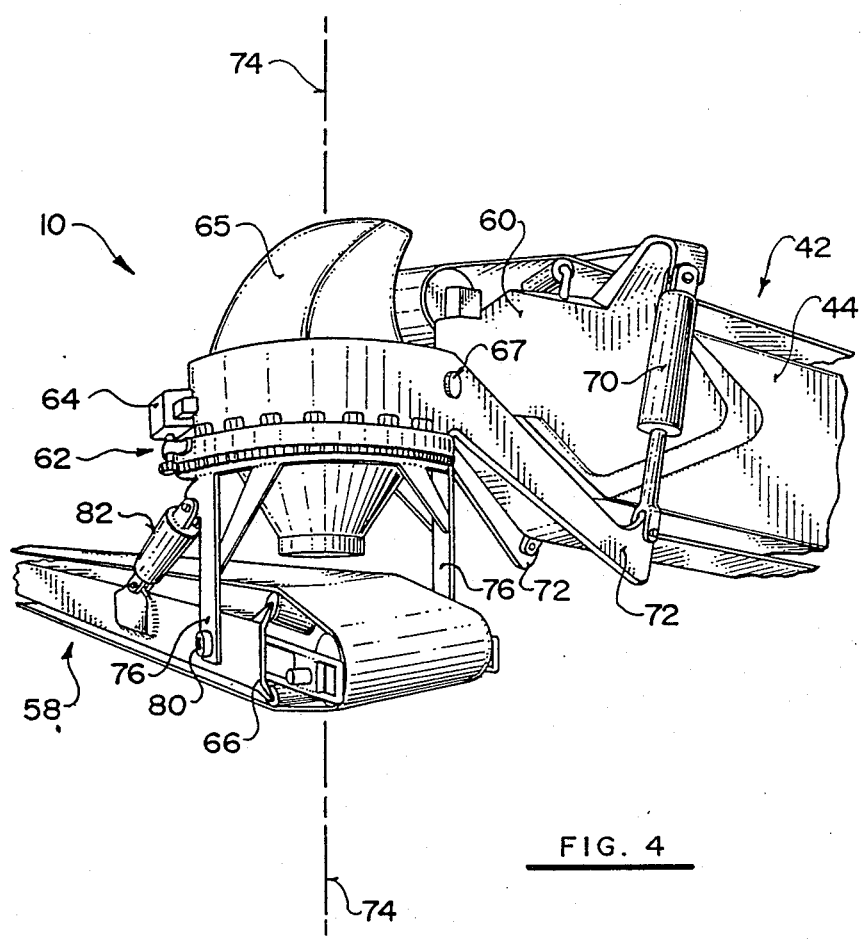
FIG. 4 is an enlarged, fragmentary perspective view showing the second end of the first conveyor, the first end of the second conveyor, and the first discharge means for discharging the first conveyor onto the second conveyor.

There is also a second conveyor 58, also called a jib conveyor, which is also conventional, having a boom and an endless belt similar to the main conveyor 42. This conveyor is cantilevered from second end 60 of the main conveyor as shown in FIGS. 1, 2 and 4. The connection between the two conveyors is accomplished by a large ring bearing 62 best shown in FIGS. 2 and 4, which has a ring gear (not shown) on its inner race. This meshes with a gear (not shown) mounted on the shaft of a motor 64 mounted on hopper 65 connected to boom 44 by pin 67. The bearing 62 acts as second connecting means for connecting the second conveyor to the second end of the first conveyor, and for permitting pivoting of the second conveyor about the second end of the first conveyor in a generally horizontal plane through an angle of 360°. Rotation is accomplished using motor 64. This may be appreciated by comparing FIG. 2 with FIG. 1. In addition, the hopper 65 acts as first discharge means for discharging material from the second end 60 of the first conveyor onto first end 66 of the second conveyor 58. A pair of hydraulic cylinders 70 operatively connect end 60 of the main conveyor to a pair of arms 72 connected to the top of hopper 65. It may be observed that the bearing 62 allows jib conveyor 58 to be rotated about central axis 74 of the hopper 65 shown in FIG. 4. Cylinders 70 and pivot pin 67 provide means for adjusting the angle of the axis 74 relative to the ground.

A pair plates 76 extend downwardly from bearing 62 on each side thereof and are pivotally connected to conveyor 58 by pin 80. A pair of hydraulic cylinders 82, one of which is shown in FIG. 2 and 4, are connected to the tops of the plates and also to conveyor 58. These serve as means for adjusting the vertical angle of the second conveyor relative to the hopper 65.

The conveyor assembly 10 also include a feed conveyor 84, also known as a third conveyor herein, as shown in FIG. 1, 2 and 3. This again is a conventional conveyor, and has a feed hopper 86 at a first end thereof as shown in FIG. 1 and 2. In normal use, the feed conveyor is inclined and has a support 87 at one end 89 for resting on the ground. A second end 91 is elevated above the main conveyor 42 for discharging into the main conveyor as seen in FIG. 3. There is a sliding ring 90 mounted in a generally horizontal position above the main conveyor by means of a pair of spaced-apart plates 92 extending down to the tops of plates 50 and 52 previously described. End 91 of the feed conveyor 84 is hingedly connected to hopper 94 rotatably mounted on top of ring 90 by pin 95, so the feed conveyor can swing from its horizontal storage position on top of conveyor 42, as shown in FIG. 2, downwardly to its inclined position for use as shown in FIG. 1 and 3. Ring 90 permits the feed conveyor to be rotated about a vertical axis through hopper 94 so hopper 86 is at a convenient location for loading. Brackets 85 on the bottom of conveyor 84 support the latter when in the storage position.

Swivels 54 and 62 allow the main conveyor 42 and the jib conveyor 58 to swing between the folded position shown in FIG. 2 and an extended position as shown in FIG. 1. By adjusting the rotation of the two swivels, the discharge end 96 of conveyor 58 may be moved to almost any point within a large horizontal plane. A discharge chute 97 is provided at the discharge end to aid in placing conveyed materials.

Furthermore, the conveyor assembly may be kept horizontal or within required angles by various adjustments described above. These include the tilting of support structure 14 forward or rearward by means of cylinders 38 of FIG. 3, sideways tilting of the support structure by means of cylinders 36 and 37 for outrigger legs 30 and 32 shown in FIG. 2, and by pivoting of the main conveyor 42 about shaft 48 by using cylinders 56 also shown in FIG. 2. Similar adjustments of the jib conveyor can be achieved by tilting hopper 65 with cylinders 70 about pivot pin 67 shown in FIG. 4 and by pivoting conveyor 58 about pin 80 by means of cylinders 82, one of which is shown in FIG. 4. When the conveyors are extended for use, such as the position of FIG. 1, the various hinged connections and hydraulic cylinder allow the conveyors to be leveled. This may be accomplished automatically using level sensors and a microprocessor.

The feed conveyor 84 can be moved to any rotational position about ring 90 for feeding material onto the main conveyor, and can be stored in a position on top of the main conveyor as shown in FIG. 2.

Referring to FIG. 2, for transport of the conveyor assembly outrigger legs 30 and 32 are raised by cylinders 36 and 37. The conveyors are rotated 90° about swivel 54 so they are aligned with frame 22 of the truck. Conveyor 84 rests on support 85 shown in FIG. 1.

It will be understood by someone skilled in the art that modifications can be made to the embodiment described above, which is described by way of example only, without departing from the scope of the invention as defined in the following claims.

What is claimed is:

1. A conveyor assembly comprising:
   a support structure;
   a first conveyor extending radially from the support structure, and having opposite first and second ends;
   a first connecting means for connecting the first end of the first conveyor to the support structure, said first connecting means including first pivotable means for permitting rotation of the first conveyor about the support structure through substantially 360 degrees in a first generally horizontal plane, said first pivotable means including:
   (i) a first portion connected to the support structure;
   (ii) a second portion rotatably connected to the first portion for rotation relative to the first portion, the second portion being connected to the first end of the first conveyor; and
   first support means, connected to the second portion of the first pivotable means at one end and to the first conveyor at the other end, for maintaining the first conveyor at a required angle with respect to said generally horizontal plane;
   a second conveyor extending from the second end of the first conveyor;
   a second connecting means for connecting the second conveyor to the second end of the first conveyor, the second connecting means including second pivotable means for permitting rotation of the second conveyor about the second end of the first conveyor through substantially 360 degrees in a generally horizontal plane, said second pivotable means including:

(i) a first portion connected to the first conveyor;

(ii) a second portion rotatably connected to the first portion for rotation relative to the first portion and connected to the second conveyor; and second support means connected to the second portion of the second pivotable means at one end and to the second conveyor at the other end for maintaining the second conveyor at a required angle with respect a second generally horizontal plane.

2. An assembly as claimed in claim 1, further comprising first discharge means for discharging the second end of the first conveyor onto the second conveyor at any rotational position of the second conveyor with respect to the first conveyor.

3. An assembly as claimed in claim 1, further comprising a third conveyor having a first end for mounting adjacent the ground, and a second end for mounting adjacent the first end of the first conveyor, second discharge means for discharging the third conveyor onto the first end of the first conveyor, and means for permitting angular adjustment of the third conveyor about a vertical axis through the first end of the first conveyor.

4. An assembly as claimed in claim 1, wherein the pivotable means are each ring bearings.

5. An assembly as claimed in claim 4, further comprising motors for rotating the conveyors about the pivotable means.

6. An assembly as claimed in claim 1, further comprising adjustment means for adjusting the angle of the first connecting means relative to a third generally horizontal plane.

7. An assembly as claimed in claim 6, wherein the adjustment means includes a pivotable connection between the first conveyor and the support structure having a horizontal axis of rotation.

8. An assembly as claimed in claim 7, wherein the adjustment means includes an hydraulic cylinder.

9. An assembly as claimed in claim 2, wherein the second conveyor is pivotable about a generally vertical axis, the assembly including means for adjusting the angle of the axis relative to the ground.

10. An assembly as claimed in claim 9, wherein the means for adjusting includes a pivotal connection between the second end of the first conveyor and the second conveyor and having a generally horizontal axis of rotation.

11. An assembly as claimed in claim 10, wherein the means for adjusting further comprises an hydraulic cylinder operatively connected between the second end of the first conveyor and the second conveyor.

12. An assembly as claimed in claim 2, further including means for adjusting the angle with respect to said second generally horizontal plane of the second conveyor relative to the first discharge means, the means for adjusting including a pivotal connection between the first discharge means and the second conveyor, and an hydraulic cylinder operatively connecting the second conveyor to the first discharge means.

13. An assembly as claimed in claim 12, wherein the first discharge means is a hopper, the second pivotal means including a ring bearing on the hopper.

14. An assembly as claimed in claim 3, further including means for foldably mounting the assembly on a vehicle so the conveyors can fold to a position overlying each other.

15. An assembly as claimed in claim 14, wherein the means for foldably mounting includes the first pivotable means and the second pivotable means.

16. A conveyor assembly as claimed in claim 1, further comprising a feed conveyor having a first end and a second end, the first end having means for loading materials onto the feed conveyor and the second end having means for mounting said second end of the feed conveyor adjacent the first end of the first conveyor so materials can be discharged from the feed conveyor onto the first conveyor.

17. A conveyor as claimed in claim 15, wherein the means for mounting the second end of the feed conveyor includes a pivotal connection having a horizontal axis of rotation.

18. A conveyor as claimed in claim 16, further comprising means for rotating the feed conveyor about a vertical axis near the first end of the first conveyor.

19. A conveyor as claimed in claim 15, further comprising means for mounting the support structure on a truck and means for folding the conveyors to a storage position overlying each other.

* * * * *